United States Patent [19]

Bunger et al.

[11] Patent Number: 5,385,748
[45] Date of Patent: Jan. 31, 1995

[54] BEVERAGE THICKENER EMULSIFIER SYSTEM

[75] Inventors: John R. Bunger, Union, Ky.; Brenda L. Keller, West Chester; Robert E. Tarr, Cincinnati, both of Ohio

[73] Assignee: The Procter & Gamble Company, Cincinnati, Ohio

[21] Appl. No.: 131,871

[22] Filed: Oct. 5, 1993

Related U.S. Application Data

[63] Continuation of Ser. No. 783,657, Oct. 28, 1991, abandoned.

[51] Int. Cl.6 .................. A23L 2/00; A23L 2/02
[52] U.S. Cl. ........................ 426/590; 426/599
[58] Field of Search .............. 426/599, 590, 573

[56] References Cited

U.S. PATENT DOCUMENTS

| | | | |
|---|---|---|---|
| 3,780,189 | 12/1973 | Scott | 426/212 |
| 3,892,871 | 7/1975 | Cooper | 426/573 |
| 3,894,132 | 7/1975 | Daniel | 264/138 |
| 3,948,881 | 4/1976 | Strong | 260/209.6 |
| 4,021,522 | 5/1977 | Daniel | 264/138 |
| 4,081,567 | 3/1978 | Haber | 426/580 |
| 4,163,808 | 8/1979 | Jackman | 426/599 |
| 4,433,000 | 2/1984 | De Leon | 426/599 |
| 4,612,204 | 9/1986 | Huffman | 426/590 |
| 4,619,833 | 10/1986 | Anderson | 426/590 |
| 4,705,691 | 11/1987 | Kupper | 426/590 |
| 4,816,283 | 3/1989 | Wade | 426/599 |
| 4,826,866 | 5/1989 | Wade | 426/599 |
| 4,834,990 | 5/1989 | Amer | 426/590 |
| 4,919,963 | 4/1990 | Heckert | 426/599 |
| 4,925,683 | 5/1990 | Fishbach | 426/590 |
| 4,935,258 | 6/1990 | Wade | 426/599 |
| 4,956,191 | 9/1990 | Ueda et al. | 426/330.3 |
| 4,986,994 | 1/1991 | Baccus | 426/590 |
| 4,988,529 | 1/1991 | Nakaya | 426/590 |
| 4,988,530 | 1/1991 | Hoersten | 426/599 |
| 5,077,075 | 12/1991 | Wade | 426/599 |
| 5,085,883 | 2/1992 | Garleb | 426/590 |
| 5,102,676 | 4/1992 | Aldcroft et al. | 426/423 |
| 5,104,676 | 4/1992 | Mahmoud | 426/590 |
| 5,126,158 | 6/1992 | Sharkasi et al. | 426/548 |

OTHER PUBLICATIONS

Glicksman, Ed. Food Hydrocolloids, I, pp. 47–61, 80–81, 128, 132, 142–46, II 176–183, III 171–183 (CRC Press, 1986).

*Primary Examiner*—Carolyn Paden
*Attorney, Agent, or Firm*—Rose Ann Dabek; J. C. Rasser

[57] ABSTRACT

This invention relates to a beverage thickener/emulsifier system which is a blend of three materials: propylene glycol alginate (a surface active thickener), xanthan (a pseudoplastic thickener) and guar gum (a Newtonian thickener). This system provides very stable oil-in-water emulsions in beverages and provides full bodied beverage texture even at acid pH. The system uses a low total gum level (below 0.4% in a single strength beverage) yet provides a very stable oil emulsion without excessive thickness.

20 Claims, No Drawings

BEVERAGE THICKENER EMULSIFIER SYSTEM

This is a continuation of application Ser. No. 07/783,657, filed on Oct. 28, 1991 now abandoned.

TECHNICAL FIELD

This invention relates to a beverage thickener/emulsifier system which is a blend of three materials: propylene glycol alginate, xanthan and guar gums. This system provides very stable oil-in-water emulsions in beverages and provides a full bodied beverage texture even at acid pH.

BACKGROUND OF THE INVENTION

Acid beverages, for example soft drinks, fruit punches, fruit juices, and like refreshments contain flavor oils. In addition, unless the sugar and/or pectin level is high they need an additive to provide body or mouthfeel. Gums and other thickeners are added to provide texture and mouthfeel. Flavor oils and clouding oils are usually emulsified into the beverage with emulsifiers or weighting oils. Other oils may also be desired to provide additional richness and opacity.

One of the problems with emulsifiers and thickening materials is that at acid pHs, particularly in the range of 3-4, the gums can be unstable and ineffective. Another problem is that the emulsification properties of the gum solution change over time and the flavor oil or other oils separate to form a ring at the top of the beverage. Weighting oils have been used to prevent this oil separation, but they have not been entirely successful. The level of weighting oil is ineffective in systems with high total oil levels. Other preventive measures include adding less oil or excessive levels of gums or thickeners.

Some of the thickening agents are pseudoplastic, i.e., they become less viscous or thinner upon shearing. This then provides a beverage which gives a thick mouthfeel but which is also easy to swallow. However, these types of materials do not always function as emulsifiers to keep the flavor oil in solution and to provide the appropriate mouthfeel at the lower acid pHs.

It has been found that a thickener/emulsifier composed of a surface active thickener, e.g., propylene glycol alginate, a pseudoplastic thickener, e.g. xanthan, and a Newtonian thickener, e.g., guar gum, used in specific combination provides a beverage in which the oil system is stable without providing an unacceptably thick texture.

Accordingly, it is an object of this invention to provide a thickener/emulsifier system which is pseudoplastic providing stability in the beverage without excessive thickness.

It is a further object of this invention to provide a thickener/emulsifier system which keeps flavor oil and clouding oils suspended even at low pH.

These and other objects of this invention will be obvious from the description herein.

SUMMARY OF THE INVENTION

A beverage thickener/emulsifier system which is characterized by being pseudoplastic at a pH of between 3 and 6 is claimed.

This beverage thickener/emulsifier system is used in a beverage comprising:
  i) from about 0.001 to 0.1% xanthan gum, from 0.001% to 0.1% guar gum, and 0.01% to 0.2% propylene glycol alginate;
  ii) from 0.001% to 85% sweetener;
  iii) from 0.001% to 0.5% clouding oils;
  iv) at least 0.001% flavor; and
  v) the remainder being water.

The beverage has a viscosity of 50 cps or less at 60 sec$^{-1}$ shear rate (11° C.).

DETAILED DESCRIPTION OF THE INVENTION

By "pseudoplastic" herein is meant that the thickener/emulsifier system in water, either alone or in a beverage system, is highly viscous at low shear rates associated with emulsion breakage but under higher shear such as drinking, mixing or shaking, will flow and become much less viscous.

All ratios, proportions and percentages herein are by weight, unless otherwise specified. The weight in the beverage is for the single strength, i.e. the beverage that is to be consumed.

As used herein, the term "comprising" means various components can be employed in the thickener/emulsifier system and the beverages containing it so long as they do not adversely affect the texture and emulsion stability of the beverages. Accordingly, the terms "consisting essentially of" and "consisting of" are embodied in the term comprising.

As used herein, the term "sweeteners" includes sugars, for example, glucose, sucrose, and fructose. Sugars also include high fructose corn syrup solids, invert sugar, sugar alcohols, including sorbitol, and mixtures thereof. Artificial or high intensity sweeteners are also included in the term sweetener.

The flavor component of the present invention contains flavors selected from natural flavors, botanical flavors and mixtures thereof. The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources.

The term "botanical flavor" refers to flavors derived from parts of a plant other than the fruit; i.e. derived from bean, nuts, bark, roots and leaves. Also included within the term "botanical flavor" are synthetically prepared flavors made to simulate botanical flavors derived from natural sources. Examples of such flavors include cocoa, chocolate, vanilla, coffee, kola, tea, and the like. Botanical flavors can be derived from natural sources such as essential oils and extracts, or can be synthetically prepared.

As used herein, the term "aqueous essence" refers to the water soluble aroma and flavor materials which are derived from fruit juices. Orange aqueous essence is the material which is recovered from the evaporation of orange juice during concentration. The aqueous essences can be fractionated, concentrated or folded essences, or enriched with added components.

As used herein, the term "essence oil" or "flavor oil" refers to the oil or water insoluble fraction of the aroma and flavor volatiles obtained from fruits, juices, or other natural sources. Orange essence oil is the oily fraction which separates from the aqueous essence obtained by evaporation of orange juice. Essence oil or flavor oils can be fractionated, concentrated or enriched.

As used herein, the term "peel oil" refers to the aroma and flavor materials obtained by extraction or pressing of citrus fruit peel. Peel oil and essence oil derived from oranges and other citrus fruits are largely composed of terpene hydrocarbons, e.g. aliphatic aldehydes and ketones, oxygenated terpenes and sesquiterpenes.

As used herein, the term "clouding agent" refers to natural or synthetic triglycerides or oils which are added to the beverage to increase opacity, to add body and flavor.

Thickener/Emulsifier System

The beverage thickener/emulsifier system consists of a specific combination of three known thickeners. Each of these thickeners has been used alone, or in combination as blends of two components. However, it has been found that the use of all three of these thickeners, in specific amounts provides a system which gives the beverage a desirable viscosity or thickness, stability of the flavor oils and clouding oils, and flavor display.

The thickener/emulsifier system consists of three thickeners each of which brings unique properties to the beverage. They are a Newtonian thickener, a pseudoplastic thickener and surface active thickener. Together they provide a beverage which is stable even when clouding oils are used yet, the texture remains palatable.

A. Newtonian Thickener

Guar gum is derived from the guar plant and consists of a high molecular weight polysaccharide composed of glactan and mannan units combined by glycosidic linkages. It has been described as glactomannan. Guar gum solutions are usually stable at a pH of from $3\frac{1}{2}$ to 9 and exhibits Newtonian behavior.

Guar gum is used at levels of 0.1–0.2% in fruit nectars to improve the mouthfeel. It also is used to facilitate the homogeneous dispersion of pulp. Guar gum solutions of 1% or higher are thixotropic and unsuited for beverages at this level because of their high viscosity.

The compositions herein used from about 0.001% to about 0.1% guar gum by weight of finished beverage. Preferably from about 0.005% to about 0.075%, and most preferably from 0.01% to 0.04% is used. Preferably the guar gum is a finely ground guar gum. These materials form a solution at 1% that has a viscosity in the range of 500 cps at room temperature. The smaller the particle size the more soluble and better the guar gum hydrates. Preferred for use herein are guar gums having a particle size in the range of 150 microns or less. Preferably, the particle size is between 50 microns and 150 microns. Suitable guar gums are available from TIC Gums, Belkamp, Md. and Rhône-Polonc (France).

B. Pseudoplastic Thickener

Xanthan gum is an exocellular heteropolysaccharide produced by a fermentation process using the bacteria *Xanthomonas campestris*. Xanthan gum is a polymer with five sugar residues, two glucose units, two mannose units, and one glucuronic acid. The backbone of the unit is a 1,4 linked β-D-glucose. This backbone is identical in structure to cellulose.

Xanthan gum solutions are highly pseudoplastic. Under increasing shear, the viscosity is progressively reduced. When the shear is removed, the viscosity recovers almost instantaneous. The xanthan molecule is highly elastic.

Xanthan is stable at pHs of 2 to 12. Xanthans are usually used at a level of 0.1–0.3% in beverages. They are said to be effective in stabilizing emulsions and suspensions against separation. The combination of guar gum and xanthan gums does not form gels at pH of 3 to 5, but does produce a higher viscosity than would be predicted by the combination of the two materials.

The xanthan gums as used herein are used at percentages of from about 0.001% to about 0.1% based upon the total beverage composition. Preferably from about 0.005% to 0.075%, and most preferably from about 0.01% to about 0.04% is used. The preferred xanthan gums have a particle size in the range of 350–400 microns. This is a 40 mesh product. Xanthan gums are available from many commercial sources including Kelco, a Division of Merck Company (California) and TIC Gums.

C. Surface Active Thickener

The third ingredient of the triblend thickener/emulsifier system is a propylene glycol alginate. This is a derivative of algin, a product derived from seaweed. Algin is a polymer containing mannuronic and guluronic acids. It is reacted with propylene oxide to form a propylene glycol alginate. Propylene glycol alginates are available in two different viscosity products. Both products can be used herein. Less of the higher viscosity product is needed to get the desired result.

Propylene glycol alginate has improved acid stability over unsubstituted alginic acids and their salts, and is more resistant to precipitation by calcium and other polyvalent metal ions. The propylene glycol is bonded to the alginate through the carboxyl groups.

Propylene glycol alginate is available from Kelco under the tradename Kelcoloid or Manucol Ester. It is also available from other suppliers. The particle size ranges from 840 microns to 150 microns. The percentage of propylene glycol alginate used in the beverages herein is from about 0.01% to about 0.20%, preferably between about 0.03% and about 0.1% and most preferably from about 0.05% to about 0.08%.

Propylene glycol alginate alone is a good thickener which exhibits slight pseudoplastic behavior. However, it is expensive, unstable at low pH relative to guar and xanthan, and does not provide the pseudoplasticity at equivalent levels of xanthan.

The particular combination of xanthan gum which is a pseudoplastic gum and guar, a Newtonian gum, with the surfactant properties of propylene glycol alginate provides a unique thickener/emulsifier system that stabilizes the emulsion in acid beverages, particularly in the pH range of 3-6 and most particularly in the pH range of 3 to $4\frac{1}{2}$. This combination also produces the desirable viscosity and high emulsion stability.

While this thickener/emulsifier system has been illustrated with propylene glycol alginate, xanthan and guar gums, other similar thickeners could be used. For example CMC (carboxymethyl cellulose) or pectin could be used instead of or with the guar gum; gum tragacanth or acacia gum can replace the propylene glycol alginate or be used with it.

Flavor intensity can also be an issue with the gums. Gums can mask flavor or provide their own flavors to the product. The compositions herein have a flavor intensity which is similar to a control product made with only propylene glycol alginate. Thus, neither the guar gum nor xanthan gum in these compositions contributes to an off flavor in the final beverage.

This particular triblend uses inexpensive guar gum, and lower levels of both the xanthan and propylene glycol alginate than would be used in any other combination of the individual pairs to make a product that functions well.

Flavor Component

The particular amount of the flavor component effective for imparting flavor characteristics to the beverages ("flavor enhancing") can depend upon the flavor(s) selected, the flavor impression desired, and the form of the flavor component. The flavor component usually comprises at least 0.001% by weight of the beverage to about 1%. When fruit juice is the flavorant, from about 3% to about 40% is used. Up to 100% fruit juice can be used in the beverages.

Aroma and flavor volatiles are those compounds which partition from the beverage into the headspace above the beverage. Volatile compounds generally include a low boiling fraction, i.e., a highly volatile fraction, and a high boiling fraction, i.e., a less volatile fraction. Aqueous essence usually contains the highly volatile fraction and essence oil, flavor oil or peel oil contain the less volatile fraction. From about 0.001% to about 1.0% of aqueous essence and essence oil are used in citrus flavored juices.

For most citrus fruit juices, the highly volatile compounds are characterized by having a boiling point less than about 131° C. These highly volatile compounds are generally low molecular weight aldehydes, ketones, alcohols, esters and acids. They also include low molecular weight sulfur compounds (e.g., thiols, sulfides), and low molecular weight nitrogen compounds (e.g., amines, pyrazines, pyridines, etc.).

The lesser volatile fraction comprise those compounds which elute after the highly volatile compounds. These lesser volatile compounds include terpenes, higher molecular weight alcohols (e.g. linalool), esters, aldehydes (e.g. geranial, nerol, octanal, and decanal), ketones and ketoacids.

For chocolate or cocoa, the amount of flavor added is from about 0.05% to about 20%. Lower levels of artificial or synthetic chocolate flavors are used than for cocoa itself.

Beverages can be flavored with fruit or other botanical flavors, e.g., cola, coffee, cocoa, tea, vanilla, strawberry, cherry, pineapple, banana, and mixtures thereof.

Any juice can be used to make the beverage of this invention. For example, apple, cranberry, pear, peach, plum, apricot, nectarine, grape, cherry, currant, raspberry, gooseberry, blackberry, blueberry, strawberry, lime, lemon, orange, grapefruit, tangerine, tomato, lettuce, celery, spinach, cabbage, watercress, dandelion, rhubarb, carrot, beet, cucumber, pineapple, custardapple, cocona, pomegranate, guava, kiwi, mango, papaya, tamarindo, banana, watermelon and cantaloupe can be used. Preferred juices are the citrus juices, and most preferred is orange juice. Of the non-citrus juices, apple, pear, cranberry, strawberry, grape, cherry, tamarindo, pineapple, mango and kiwi are preferred.

Clouding Agent

The beverages can also contain clouding agents. Clouding agents are oils, primarily natural or synthetic triglycerides, which are added to the beverage to increase the opacity of the beverage and to add body. Weighting oils are added to keep these clouding agents in suspension.

From about 0.001% to about 0.5%, and preferably from about 0.01% to about 0.25% clouding agents are used herein. Preferred clouding agents are vegetable oils, preferably selected from the group of hydrogenated and unhydrogenated soybean oil, corn oil, safflower oil, sunflower seed oil, canola oil, rape (both high and low erucic acid) oils, cottonseed oil, medium chain triglycerides, and mixtures thereof. Low or zero calorie oils, such as sucrose polyesters, siloxanes, and propylene glycol esters can be used.

Other Ingredients

Other minor ingredients are frequently included in the beverages. Such ingredients include preservatives such as benzoic acid and salts thereof, sulfur dioxide, butylated hydroxyanisole, butylated hydroxytoluene, etc. Natural or synthetically prepared colors can be added. Salt, e.g. sodium chloride, and other flavor enhancers can be used to improve the flavor of the beverage.

Emulsifiers can also be included in the beverage. Food grade or edible emulsifiers include mono and di-glycerides of long chain fatty acids, preferably saturated fatty acids, and most preferably, stearic and palmitic acid mono- and diglycerides. Propylene glycol esters of these same fatty acids and lecithin are also useful in beverages.

See L. F. Green, *Developments in Soft Drinks Technology*, Vol. 1 (Applied Science Publishers Ltd. 1978), pp. 185–186 (herein incorporated by reference) for preservatives and colors used in beverages.

Sweetener Component

The sweetener composition is usually a monosaccharide or a disaccharide. These include sucrose, fructose, dextrose, maltose and lactose, but other carbohydrates can be used if less sweetness is desired. Mixtures of sugars can be used also.

Other natural or artificial sweeteners can be used. These include saccharin, cyclamates, acetosulfam, L-aspartyl-L-phenylalanine lower alkyl ester sweeteners (e.g. aspartame), L-aspartyl-D-alanine amides disclosed in U.S. Pat. No. 4,411,925 to Brennan et al., issued Oct. 23, 1983, L-aspartyl-D-serine amides disclosed in U.S. Pat. No. 4,399,163 at Brennan et al., issued Aug. 16, 1983, L-aspartyl-L-1-hydroxymethyl-alkaneamide sweeteners disclosed in U.S. Pat. No. 4,338,346 to Brand, issued Dec. 21, 1982, L-aspartyl-1-hydroxyethyl-alkaneamide sweeteners disclosed in U.S. Pat. No. 4,423,029 to Rizzi, issued Dec. 27, 1983, L-aspartyl-D-phenylglycine ester and amide sweeteners disclosed in European Patent Application 168,112 to J. M. Janusz, published Jan. 15, 1986, and the like. A particularly preferred sweetener is aspartame.

The amount of the sweetener effective in the food, beverage, mixes or supplements of the invention depends upon the particular sweetener used and the sweetness intensity desired. For noncaloric sweeteners, the amount varies depending upon the sweetness intensity of the particular sweetener (from about 0.001% to 5%). For sucrose, this amount can be from 10% to 85% (typically from 55% to 70%) by weight. In determining the amount of sugar, any sugar or other sweetener present in the flavor component or juice is also included. Low-calorie sweetener combinations containing a noncaloric sweetener such as aspartame and a sugar, such as corn syrup solids, or sugar alcohols can also be used in beverage mixes. In general, the amount of sweetener will be from about 0.001% to about 85%. For artificial sweeteners, lower levels of sweetener are used, usually from about 0.001% to about 2%. The level is usually selected to be equivalent to sugar in sweetness.

A nectar can be produced by mixing from 35% to 55% juice and naturally or artificially sweetened water to make a product with a concentration of about 11° Brix or more.

If a beverage concentrate is desired, the fruit juice is concentrated by conventional means to from about 20° Brix to about 80° Brix. The juice can also be concentrated by evaporation or freeze concentration. Conventional evaporators of the ascending or descending film type, evaporators combining the ascending and descending film feature, multiple tube evaporators, plate type evaporators, expanding flow evaporators, and centrifuged evaporators, etc. can be used.

Other means of concentrating juice can be used. These would include reverse osmosis, sublimation concentration, freeze drying or freeze concentration. Economically, however, it is better to use an evaporation technique.

pH

The pH of the beverages and beverage concentrates of the present invention is dependent upon the weight ratios of the acids present in the juices or the flavorings added to the beverage. The total amount of acids added depends on the juices as well as the desired sourness impression. Typically, the pH can range from 2.5 to 6.5. Preferred beverages have a pH of from 3.0 to 6.0 and most preferred have a pH of from 3.0 to 4.5.

Beverage Preparation

The beverages and concentrates of the present invention can be prepared by standard beverage formulation techniques. It should be understood, however, that beverage making techniques, when appropriately modified, are also applicable to carbonated beverages. Also, while the following description is with reference to sugar containing beverages, diet beverages containing noncaloric and artificial sweeteners can also be prepared by appropriate modification. Beverages can include dry beverage mixes which are made by mixing flavors, sweeteners, and the thickener/emulsifier system and any optional ingredients. The ingredients are added to the water and mixed in conventional equipment. The higher shear mixer used the more viscous the beverage will be. One skilled in the art can easily ascertain the mixing conditions required to prepare a beverage of the appropriate viscosity, preferably 50 cps or less, at 60 sec$^{-1}$ shear rate (11° C.), most preferably from 3 to 16 cps.

Preferably, the thickener/emulsifier system is mixed with water under high shear and then this water mixture is added to the beverage.

In making a sugar sweetened carbonated or noncarbonated beverages, a beverage concentrate is usually formed containing from 30% to 70% by weight water. This beverage concentrate typically contains the emulsified or water-soluble flavors, thickener/emulsifier system, and weighting agents if needed, any color desired and suitable preservatives. After the concentrate is formed, sugar and water are then added to make a beverage syrup. This beverage syrup is then mixed with an appropriate quantity of water to form the finished beverage. The weight ratio of water:syrup is from about 3:1 to about 8:1. To make a carbonated beverage carbon dioxide can be introduced either into the water mixed with the beverage syrup or into the drinkable diluted beverage to achieve carbonation. The beverage can be sealed in a container such as a bottle or can. See L. F. Green, *Developments in Soft Drinks Technology*, Vol. 1, (Applied Science Publishers Ltd. 1978), pp. 102–107 (herein incorporated by reference), for a further description of beverage making, in particular the process for carbonation.

The amount of carbon dioxide in the beverage depends upon the particular flavor system used and the amount of carbonation desired. Usually, carbonated beverages of the present invention contain from 1.0 to 4.5 volumes of carbon dioxide. Preferred carbonated beverages contain from 2 to 3.5 volumes of carbon dioxide.

The acids (citric, malic, ascorbic, tartaric or phosphoric) that form a part of the flavor can be added at various points in these processes. Usually, the acids are added with the fruit juice or other flavorant.

A typical beverage concentrate has the following formula:

a) from about 0.003% to about 0.3% xanthan, from about 0.003% to about 0.3% guar gum and from about 0.03% to about 0.6% propylene glycol alginate;
b) an effective amount of a flavor;
c) from about 0.003% to about 0.15% clouding agent;
d) from about 0.003% to about 15% artificial sweetener; or from about 20% to about 85% sugars; and
e) the remainder being water.

Fiber

Fiber can be included in the beverage for dietary purposes. Dietary fiber includes pulp, psyllium, ground citrus fiber, dried juice vesicles, homogenized pulp, cellulose and substituted celluloses.

Citrus fiber refers to materials derived from an orange or citrus fruit. It is composed of the rag and a small amount of the peel and may be ground to a fine particle size. Citrus fiber is distinguished from pulp, whole juice sacs, homogenized pulp and from pectin and methoxylated pectins. Pectins can form a "cloud" in the beverage, making it opaque and viscous. The fiber added to the beverages herein can be in addition to pectin.

The present invention encompasses various fiber-supplemented juices and beverages. Single-strength products typically can have a Total Dietary Fiber content (AOAC/Prosky) of from about 0.7 to about 1.2 grams per serving or from about 1.25 to about 3 grams per serving. Up to 4 gms of fiber can be used without making a gelled product. However, in the 2 to 4 gm range the beverage will be more viscous than other beverages without fiber.

The following non-limiting example illustrates the composition of the present invention.

The juices and beverages herein can be carbonated if desired.

EXAMPLE 1

A beverage is prepared by mixing the following ingredients:

| Ingredients | Percentages |
| --- | --- |
| Guar gum | 0.02 |
| Xanthan | 0.04 |
| Propylene glycol alginate | 0.075 |
| Water | 83.165 |
| Sugar | 15.0 |
| Fruit Juice Concentrate | 1.47 |
| Peel Oil | 0.03 |

-continued

| Ingredients | Percentages |
|---|---|
| Cloud Oil (cottonseed oil) | 0.20 |

The product is made by mixing the guar gum, xanthan and propylene glycol alginate, with about 10% of the water under high shear. The remainder of ingredients are mixed with the water/thickener system under low shear.

When the product is stored for four days at a 100° F., the viscosity is 8–10 cps at 60 sec$^{-1}$ shear (11° C.). The product is comparable to the control and, there is no separation of the oil after four days. In a 0.15% propylene glycol alginate beverage (no guar or xanthan) there is considerable separation after four days at a 100° F. and the viscosity drops to 4–6 cps.

Viscosity Measurement

A Brookfield Rheoset Programmable viscometer equipped with a UL adapter, fitted with a ULA cylindrical spindle is used.

Volume of samples analyzed: 16 ml

| Volume of samples analyzed: | 16 ml |
|---|---|
| Operating temperature: | 11° C. |
| Operating Pressure: | Ambient |

Sensible pulp is removed from any juice sample by passing it through a 20 mesh screen (for concentrate products, water is added to dilute the sample to 11.8° Brix or single strength). Into the sample cup of the UL-adaptor is poured 16 ml. of the sample. The UL-adaptor of the viscometer is placed in an 11° C. waterbath. The sample is allowed to equilibrate in the waterbath for 10 minutes before a reading is taken.

The rheoset is set at zero before attaching the UL-adaptor. The viscosity sample is measured at various speeds to get a viscosity profile. Readings are taken at 30 sec intervals. A typical profile is:

| Speed (rpm) | Rate (sec$^{-1}$) | Time (sec) |
|---|---|---|
| 0.5 | 0.6 | 0 |
| 1.0 | 1.2 | 30 |
| 3.0 | 3.7 | 60 |
| 12.0 | 14.7 | 90 |
| 24.0 | 29.4 | 120 |
| 48.0 | 58.7 | 150 |
| 96.0 | 117.0 | 180 |
| 48.0 | 58.7 | 210 |
| 24.0 | 29.4 | 240 |
| 12.0 | 14.7 | 270 |
| 6.0 | 7.3 | 300 |
| 12.0 | 14.7 | 330 |
| 24.0 | 29.4 | 360 |
| 48.0 | 58.7 | 390 |
| 96.0 | 117.4 | 420 |
| 48.0 | 58.7 | 450 |
| 24.0 | 29.4 | 480 |
| 12.0 | 14.7 | 510 |
| 6.0 | 7.3 | 540 |
| 3.0 | 3.7 | 570 |
| 1.0 | 1.2 | 600 |
| 0.5 | 0.6 | 630 |

Viscosity is a measure of the resistance to flow when a sample is subjected to an applied shearing force. It is said to be Newtonian when the flow is directly proportional to the force applied. Pseudoplastic rheological property is an alignment in solution occuring proportional to force and results in less resistance to flow.

The Brookfield Rheoset electronically measures the stress/strain of liquids and expresses this value as Absolute Viscosity. It accounts for resistance depending upon the characteristic dimension of the spindle and cup in which it is measured: ULA vessel. Using the Rheoset LV model the viscosity (cps) is as follows:

$$\eta = \text{viscosity} = \frac{F}{s} = \frac{\text{Shear Stress}}{\text{Shear Rate}} \times 100 = cps$$

Shear Rate = rpm × 1.23 (shear rate constant)
shear Stress is measured by the instrument in dynes/cm$^2$

What is claimed is:

1. A beverage which comprises:
   a) from about 0.001% to about 0.1% xanthan, from about 0.001% to about 0.1% guar gum, and from about 0.01% to about 0.2% propylene glycol alginate;
   b) a flavor component in an amount effective impart flavor characteristics to the beverage;
   c) from about 0.001% to about 0.5% clouding agent;
   d) an effective amount of a sweetener; and
   e) the remainder being water, said beverage having a viscosity of 50 cps or less at 60 seconds$^{-1}$ shear rate (11° C.) and, wherein said beverage is characterized by having a stable oil in water emulsion.

2. The beverage of claim 1 wherein said sweetener comprises from about 6% to 14% by weight sugar and wherein said flavor is from about 0.001% to about 40%.

3. The beverage of claim 2 wherein said sugar is high fructose corn syrup and wherein the viscosity is 50 cps or less at 60 sec$^{-1}$ shear rate (11° C.).

4. A beverage according to claim 3 wherein said flavor is from 5% to 100% fruit juice.

5. A beverage according to claim 4 wherein said juice is selected from the group consisting of citrus juices, apple juice, pear juice, cranberry juice, tamarindo, pineapple, mango and mixtures thereof.

6. A beverage according to claim 2 comprising from 0.01% to about 0.04% xanthan, from 0.01% to 0.04% to guar gum and from 0.03% to 0.1% propylene glycol alginate.

7. The beverage of claim 1 wherein said sweetener comprises from 0.001% to 5% non-caloric or artificial sweetener.

8. A beverage according to claim 7 wherein said juice is selected from the group consisting of orange, lime, lemon, grapefruit, tangerine, mango, strawberry, pineapple, apple, pear, tamarindo, kiwi and mixtures thereof.

9. A beverage according to claim 1 comprising from 0.5% to 1.6% fiber.

10. A beverage according to claim 9 comprising from 0.15% to 3% fiber.

11. A beverage concentrate for preparing a drinkable beverage which comprises:
   a) from about 0.003% to about 0.3% xanthan, from about 0.003% to about 0.3% guar gum, and from about 0.003% to about 0.60% propylene glycol alginate;
   b) from 0.001% to 45% of a flavor component which contains a flavor selected from the group consisting of fruit flavors, botanical flavors, and mixtures thereof;

c) from about 18% to about 85% by weight sugar; and d) from 0.003% to about 1.5% clouding agent;

e) the remainder being water, wherein said beverage concentrate provides a beverage having a viscosity of 50 cps or less at 60 seconds$^{-1}$ shear rate (11° C.) and wherein said beverage is characterized by a stable oil and water emulsion.

12. A beverage concentrate according to claim 11 wherein said flavor is a fruit concentrate.

13. A beverage concentrate according to claim 12 wherein said flavor includes orange essence and essence oil.

14. A beverage concentrate according to claim 9 comprising from 0.03% to 0.12% xanthan, from 0.03% to 0.12% guar gum, and from 0.09% to 0.3% propylene glycol alginate.

15. A beverage concentrate according to claim 12 wherein said fruit flavor is selected from the group consisting of citrus, apple, pear, cranberry, mango, strawberry, pineapple, tamarindo and mixtures thereof.

16. A beverage concentrate according to claim 15 wherein said flavor is selected from the group consisting of orange, lime, lemon, grapefruit, tangerine and mixtures thereof.

17. A beverage concentrate according to claim 16 wherein said juice is orange juice.

18. A process for making a beverage comprising:

(a) adding from about 0.01% to about 1.2% thickeners/emulsifier system having a particle size of less than 180 microns to from about 10% to about 99% fruit juice and from 4% to 90% water by mixing at below temperature 65° C. with minimal shear;

(b) adding aroma and flavor volatiles to the juice mixture to produce a beverage having an initial viscosity of 50 cps or less at 60 sec$^{-1}$ shear rate (11° C.).

19. A beverage which comprises:

(a) from about 0.001% to about 0.1% of a Newtonian thickener from about 0.1% to about 0.2% surface active thickener and from about 0.001% to about 0.1% pseudoplastic thickener; and (b) a flavor component in an amount effective to impart flavor characteristics to the beverage;

(c) an effective amount of a sweetener;

(d) from 0.1% to about 0.5% clouding oil; and (e) the remainder being water, said beverage having a viscosity of 50 cps or less at 60 seconds$^{-1}$ shear rate (11° C.) and, wherein said beverage is characterized by having a stable oil in water emulsion.

20. The beverage of claim 19 wherein said sweetener comprises from about 6% to 14% by weight sugar wherein said flavor is from about 0.001% to about 45%.

* * * * *